United States Patent [19]

Takei et al.

[11] Patent Number: 5,248,927
[45] Date of Patent: Sep. 28, 1993

[54] BATTERY PACK WITH TEMPERATURE DETECTING ELEMENT AND BATTERY CHARGER THEREFOR

[75] Inventors: Toshitaka Takei, Kanagawa; Hiroyuki Arakawa, Tokyo, both of Japan

[73] Assignee: Sony Corporation, Japan

[21] Appl. No.: 850,030

[22] Filed: Mar. 12, 1992

[30] Foreign Application Priority Data

Mar. 18, 1991 [JP] Japan .................. 3-052555

[51] Int. Cl.[5] .................. H01M 10/46; H01M 14/00; H01M 2/10; H02J 7/00
[52] U.S. Cl. .......................... 320/2; 320/35; 429/7; 429/99
[58] Field of Search ............... 320/2, 35, 36; 429/7, 429/96–100

[56] References Cited

U.S. PATENT DOCUMENTS

| | | | |
|---|---|---|---|
| 3,667,026 | 5/1972 | Bogut et al. | 320/36 |
| 3,917,990 | 11/1975 | Sherman, Jr. | 320/35 |
| 4,006,396 | 2/1977 | Bogut | 320/2 |
| 4,315,364 | 2/1982 | Leffingwell | 320/2 X |
| 4,468,605 | 8/1984 | Fitzgerald et al. | 320/36 |
| 5,111,128 | 5/1992 | Branan, Jr. et al. | 320/2 |

*Primary Examiner*—R. J. Hickey
*Attorney, Agent, or Firm*—Ronald P. Kananen

[57] ABSTRACT

A battery pack composed of an array of secondary cells includes first and second electrodes for charging and discharging the battery pack. The battery pack has a temperature detecting element disposed below the first and second electrodes. The temperature detecting element is electrically connected through a lead to a third electrode in the form of a thin sheet disposed between the side of one of the cells and a lower casing member of a battery pack casing. The first and second electrodes remains in the same position as those of conventional battery packs. The battery pack can be charged by a battery charger which has a third terminal for receiving a temperature signal supplied from the temperature detecting element through the third electrode. The charging process for charging the battery pack is controlled based on the temperature of the cells as detected by the temperature detecting element. The battery charger is compatible for use with different types of battery packs such as battery packs of nickel-cadmium and nickel-hydrogen cells.

8 Claims, 5 Drawing Sheets

BATTERY PACK WITH TEMPERATURE DETECTING ELEMENT AND BATTERY CHARGER THEREFOR

BACKGROUND OF THE INVENTION

1. Field of the Invention

The present invention relates to a battery pack for use with a video camera and a battery charger for charging the battery pack.

2. Description of the Prior Art

For outdoor use of a video camera, for example, a battery pack is usually mounted on the video camera as a portable electric power supply that makes the video camera handy in areas where no commercial electric power outlets are available.

FIG. 1 of the accompanying drawings shows one conventional battery pack for use on a video camera. As shown in FIG. 1, the battery pack comprises a cell array 7 composed of juxtaposed cylindrical nickel-cadmium secondary cells 1, 2, 3, 4, 5 that are electrically connected by a conductor plate 6 and other conductors. An electrically insulating sheet 8 is inserted between the conductor plate 6 and the cells 2, 3, 4. The cell array 7 has first and second electrodes 9, 10 as positive and negative electrodes for charging and discharging the battery pack. A breaker (not shown) is held by a molded member 11 below the first and second electrodes 9, 10. The cell array 7 and the other components are housed in a plastic casing 14 which comprises upper and lower casing members 12, 13. The casing 14 is substantially in the shape of a rectangular parallelepiped such that it houses the cell array 7 in intimate contact therewith for reducing the size and weight of the battery pack.

To charge the battery pack, it is generally mounted on a dedicated battery charger (not shown). For proper mounting of the battery pack on the battery charger, the lower case 13 that will contact the battery charger has a plurality of integral recesses 16, and the battery charger has a plurality of teeth on its case for engagement in the respective recesses 16 in the lower case 13. The recesses 16 are positioned in gaps 17A~17D, respectively, between the cells 1~5 for the reduction of the size and weight of the battery pack.

There are demands for video camera battery packs of small size and large energy storage capacity.

When battery packs of nickel-hydrogen secondary cells are quickly charged, their temperature rises more sharply than the temperature of battery packs of nickel-cadmium secondary cells. Therefore, the charging process for a nickel-hydrogen battery pack has to be controlled while monitoring the temperature thereof. For such charging process control, it is necessary for the battery pack to have a temperature detecting element such as a thermistor or the like, and a third electrode for outputting a detected signal from the temperature detecting element, and also for a battery charger to have a third terminal for receiving the detected signal from the third electrode, and a control circuit for controlling the charging process based on the received signal. Such a battery charger should preferably be compatible for use with different types of battery packs so that it can also be used to charge conventional battery packs of the type shown in FIG. 1 that are widely available on the market.

One problem with the prior battery pack shown in FIG. 1 is that since the cell array 7 and other components are already closely positioned in the casing 14, it is not easy to create a space large enough to accommodate the third electrode. Furthermore, the third electrode must be incorporated in a layout that is designed taking account of safety and reliability considerations.

OBJECTS AND SUMMARY OF THE INVENTION

It is an object of the present invention to provide a battery pack which is highly safe and reliable, the battery pack having a temperature detecting element and an associated electrode, and a battery charger for charging the battery pack, which may be a battery pack of nickel-cadmium or nickel-hydrogen secondary cells.

According to the present invention, there is provided a battery pack comprising a casing, an array of juxtaposed cylindrical cells housed in the casing, the cells defining gaps therebetween, first and second electrodes housed in the casing for charging and discharging the cells, the first and second electrodes being disposed in one of the gaps, the casing having a plurality of recesses defined therein and positioned in the gaps, a temperature detecting element disposed in the casing for detecting the temperature of the cells, a third electrode disposed in the casing and electrically connected to the temperature detecting element, the third electrode comprising a thin sheet disposed between a side of one of the cells and the casing.

According to the present invention, the battery pack of the above arrangement can be charged by a battery charger comprising a housing having a cavity defined in a surface thereof for receiving the casing of the battery pack, first and second terminals mounted on the bottom of the cavity for electric contact with the first and second electrodes, respectively, a third terminal mounted on the bottom of the cavity for electric contact with the third electrode, a plurality of teeth mounted on the bottom of the cavity for fitting engagement in the recesses, respectively, and circuit means for charging the battery pack received in the cavity through the first and second electrodes and the first and second terminals which are held in electric contact with each other, and for controlling the charging process based on a temperature signal supplied from the temperature detecting element through the third electrode and the third terminal which are held in electric contact with each other.

The third electrode, which is in the form of a thin sheet, is disposed between the side of one of the cells and a lower casing member of the casing. The first and second electrodes remain in the same position as those of conventional battery packs. The battery pack is therefore as safe and reliable as the conventional battery packs.

The battery charger has the third terminal for receiving a temperature signal supplied from the temperature detecting element through the third electrode. The charging process for charging the battery pack is controlled based on the temperature of the cells as detected by the temperature detecting element. The battery charger is compatible for use with different types of battery packs such as battery packs of nickel-cadmium and nickel-hydrogen cells.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 2:
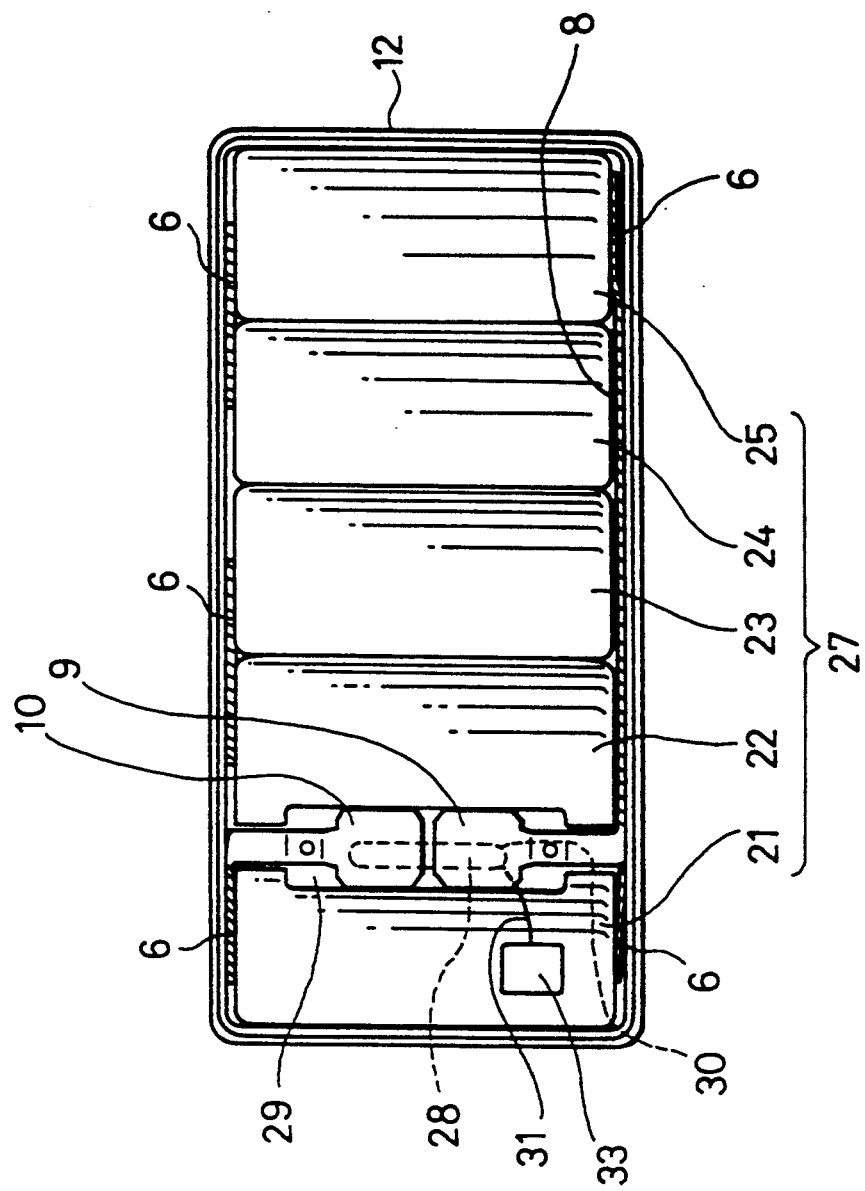
FIG. 2 is a front elevational view of a battery pack according to the present invention.
Figure 3:
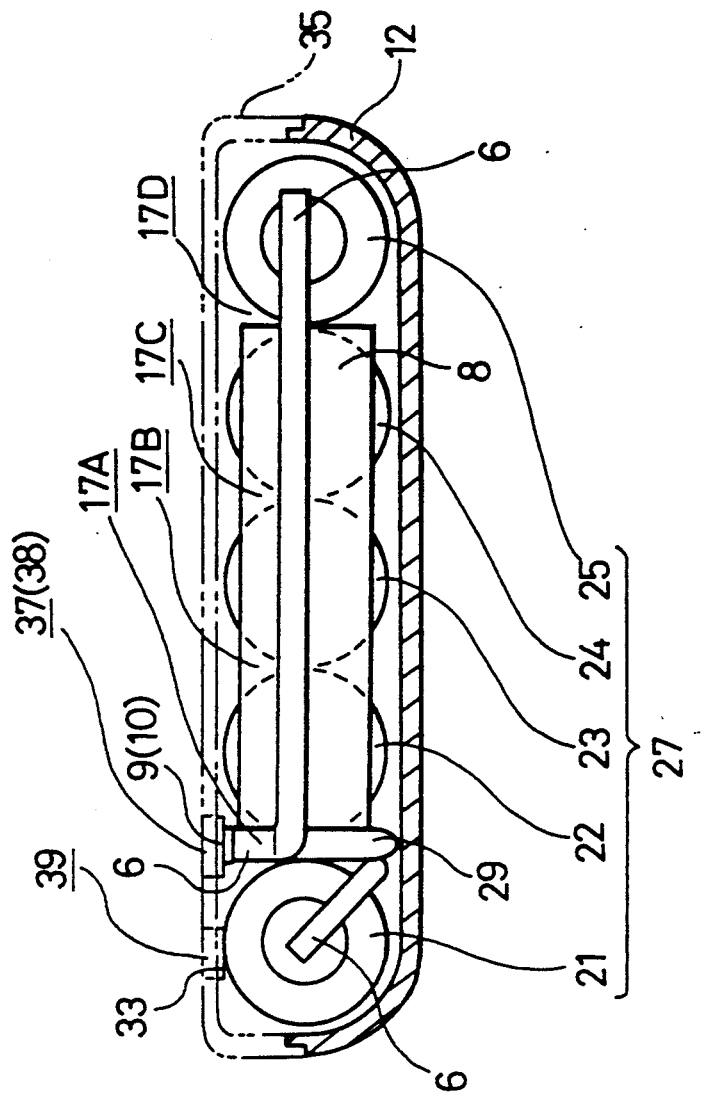
FIG. 3 is a cross-sectional view of the battery pack shown in FIG. 2.

As shown in FIGS. 2 and 3, a battery pack according to the present invention has a plastic casing composed of an upper casing member 12 and a lower casing member 35 which are detachably connected to each other. The upper casing member 12 houses therein a cell array 27 composed of juxtaposed cylindrical nickel-hydrogen secondary cells 21, 22, 23, 24, 25 that are electrically connected by a conductor plate 6 on an electrically insulating sheet 8 and other conductors. The cell array 27 has first and second electrodes 9, 10 as positive and negative electrodes for charging and discharging the battery pack. A temperature detecting element 28 such as a thermistor and a breaker (not shown) are electrically insulated by a molded member 29 and positioned below the first and second electrodes 9, 10. The first and second electrodes 9, 10 are also held by the molded member 29.

As shown in FIG. 2, the temperature detecting element 28 has a lead 30 connected to the first electrode 9 and another lead 31 connected to a third electrode 33 for outputting a detected temperature signal. The third electrode 33 is in the form of a thin sheet and may be bonded to the cell 21 by an adhesive, or integrally held by the molded member 29.

As shown in FIG. 3, the cell array 27 and the first, second, and third electrodes 9, 10, 33 are held against the inner surface of the lower casing member 35.

Figure 4:
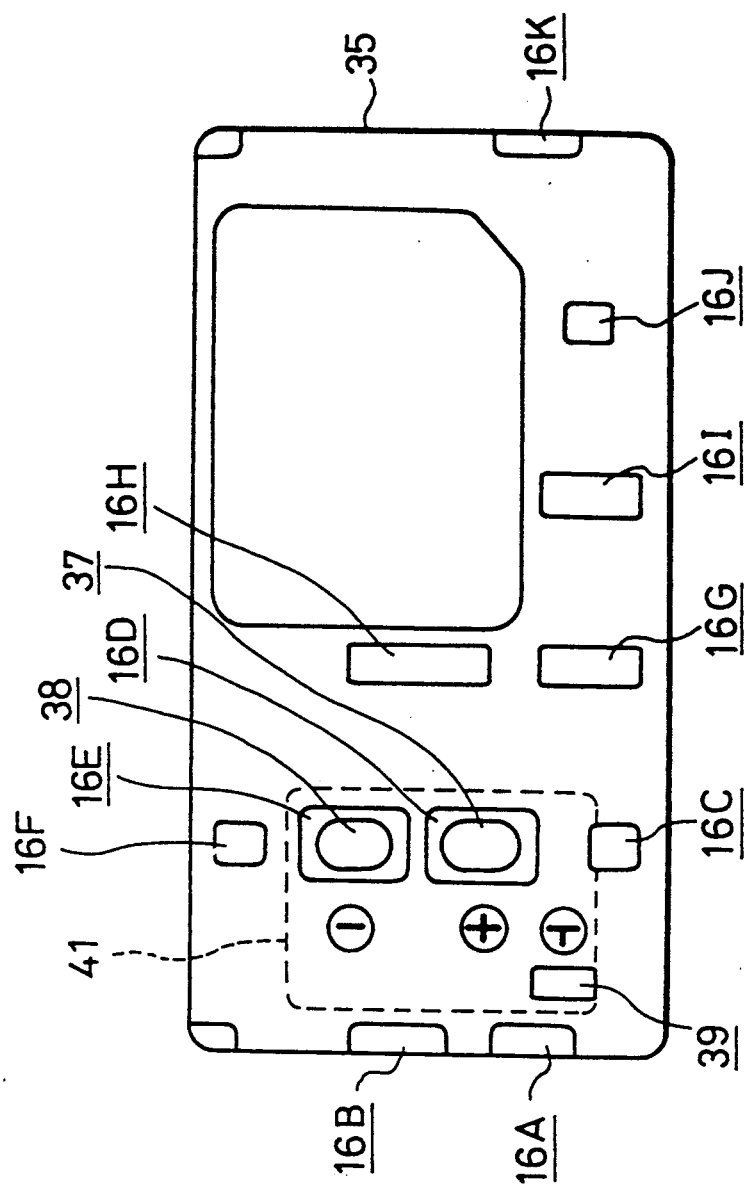
FIG. 4 is a front elevational view of a lower case of the battery pack shown in FIG. 2.

As illustrated in FIG. 4, the outer surface of the lower casing member 35 has recesses 16A~16K defined therein. The lower casing member 35 also has holes 37, 38 defined in the bottoms of the recesses 16D, 16E. The recesses 16A, 16B are positioned at a shorter side of the lower casing member 35, and the recess 16K is positioned in an opposite shorter side of the lower casing member 35. The recesses 16C~16J and the holes 37, 38 are positioned in gaps 17A~17D between the juxtaposed cells 21~25. The lower casing member 35 also has a hole 39 defined therein near the recess 16A. When the lower casing member 35 is placed over the upper casing member 12, completing the casing 40 with the cell array 27 housed therein, the first, second, and third electrodes 9, 10, 33 are positioned respectively underneath the holes 37, 38, 39 in the lower casing member 35.

The outer surface of the lower casing member 35 is marked with indicia +, −, ⊥ in circles indicating the positive, negative, and temperature electrodes, respectively, the indicia being formed by surface irregularities when the lower casing member 35 is molded of plastic. The bottom casing member 35 is black in color as a whole, except that an area enclosed by a dotted line 41 surrounding the holes 37, 38, 39 is colored in a different hue such as blue.

Figure 5:
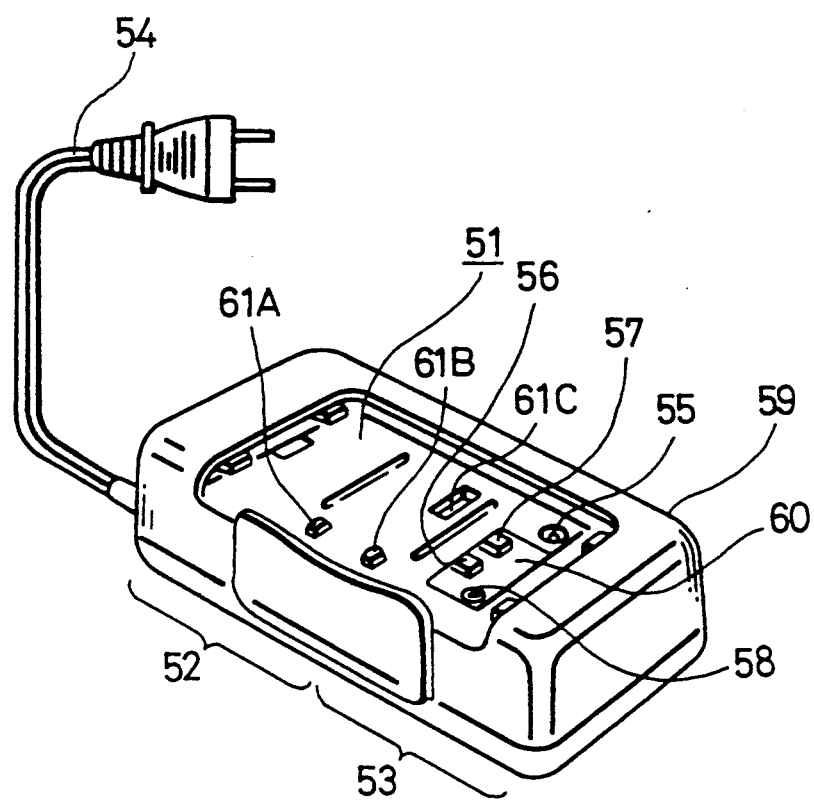
FIG. 5 is a perspective view of a battery charger according to the present invention.

FIG. 5 shows a battery charger according to the present invention, for charging the battery pack shown in FIGS. 2 through 4. The battery pack is shown as being mounted on the battery charger in FIG. 6.

The battery charger includes an outer housing 59 molded of plastic which is black in color, the outer housing 59 having a cavity 51 defined in its upper surface complementarily in size to the lower casing member 35. The battery charger has a first power supply circuit section 52 including a power transformer, etc., and a second power supply circuit section 53 including a rectifying circuit, etc. An AC cord 54 with a plug is connected to the first power supply circuit section 52. The second power supply circuit section 53 has an adapter plug 55 for outputting DC electric power, first and second terminals 56, 57 for supplying a charging current to the battery pack, and a third terminal 58 for receiving a temperature signal from the temperature detecting element 28. The first, second, and third terminals 56, 57, 58 are spring-loaded under spring pressures such that the spring pressure applied to the third terminal 58 is about ⅓ of the spring pressure applied to the first and second terminals 56, 57. The first, second, and third terminals 56, 57, 58 are mounted on a molded plate 60 having a hue such as blue different from the black color of the outer housing 59. The molded plate 60 is disposed in the bottom of the cavity 51.

The second power supply circuit section 53 includes a control circuit which calculates the surface temperature of the cells 21, 22 based on the temperature signal that has been supplied from the temperature detecting element 31 in the battery pack through the third electrode 33 to the third terminal 58, and temporarily cuts off the charging current supplied from the first and second terminals 56, 57 to the first and second electrodes 9, 10 in the battery pack when the calculated surface temperature exceeds a predetermined temperature. The control circuit also serves to control the process of charging the battery pack. When the battery pack is charged, the voltage between the first and second terminals 56, 57 is gradually increased, and the control circuit finishes the charging process when the voltage between the first and second terminals 56, 57 is slightly lowered after the voltage has reached a peak value.

Figure 1:
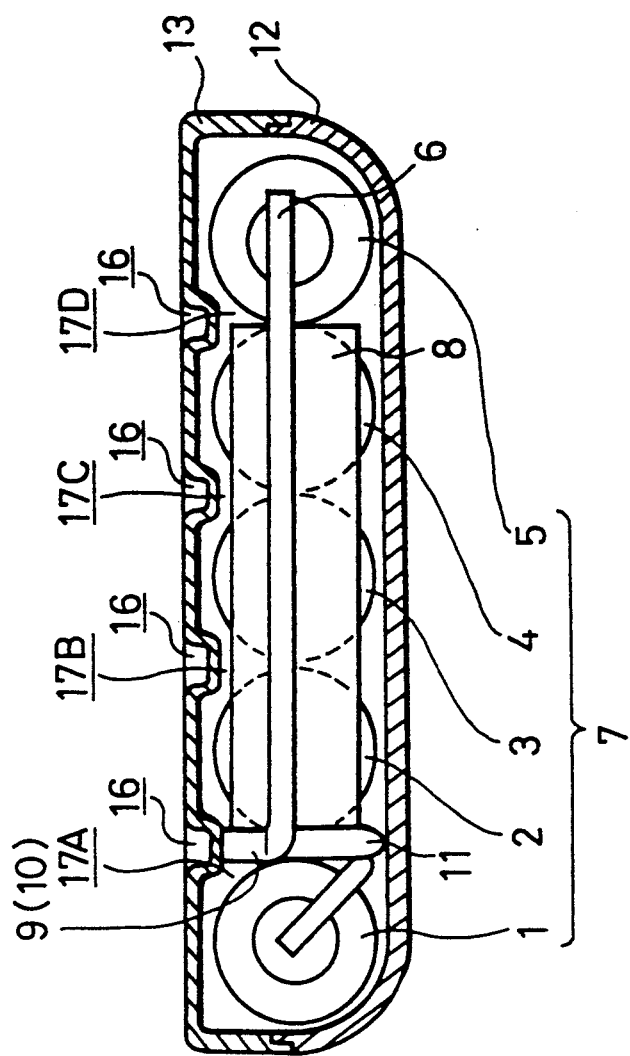
FIG. 1 is a cross-sectional view of a conventional battery pack.

The battery charger has integral teeth 61A, 61B, 61C on the bottom of the cavity 51. When the battery pack is mounted in the cavity 51, the teeth 61A, 61B, 61C snugly fit respectively in the recesses 16I, 16G, 16H in the lower casing member 35 of the battery pack. Therefore, any attempts to mount the battery pack in wrong orientations on the battery charger are prevented, and the battery pack is always properly mounted on the battery charger. When the teeth 61A, 61B, 61C are snugly received in the recesses 16I, 16G, 16H, the first, second, and third terminals 56, 57, 58 and the first, second, and third terminals 9, 10, 33 are mechanically held in contact with each other under the spring pressures so that they are kept in good electric contact with each other. Since the spring pressure applied to the third terminal 58 is weaker than the spring pressure applied to the first and second terminals 56, 57, the third terminal 58 will not damage the surface of the lower casing member of the conventional battery pack as shown in FIG. 1 which is free of the third electrode 33. Therefore, the battery charger according to the present invention is compatible for use with different types of battery packs such as battery packs of nickel-cadmium and nickel-hydrogen cells.

Figure 6:
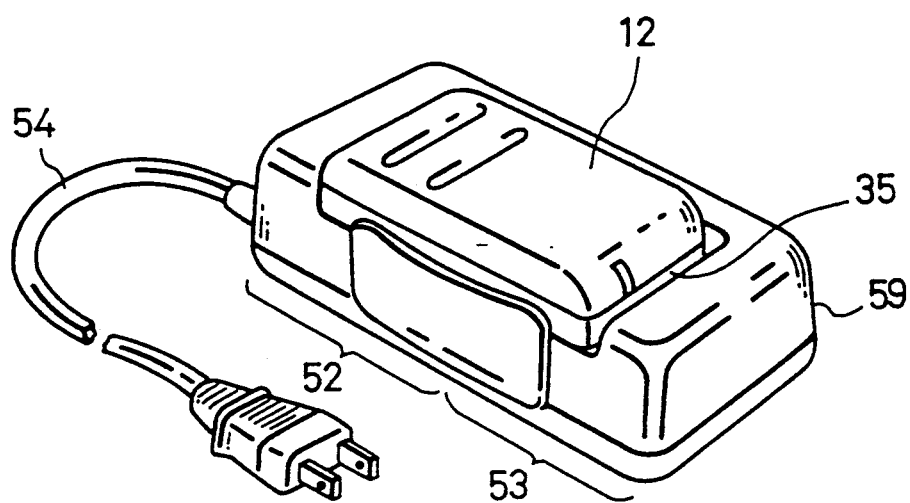
FIG. 6 is a perspective view of the battery charger shown in FIG. 5, with the battery pack mounted thereon.

The battery pack and the battery charger according to the present invention offer the following advantages:

(1) Since the third electrode 33 in the form of a thin sheet is disposed between the side of the cell 21 and the lower casing member 35, the first and second electrodes 9, 10 are not required to be changed in position from those of the conventional battery pack. As a result, the battery pack according to the present invention is as safe and reliable as the conventional battery pack. More specifically, when the battery pack is mounted on the battery charger, as shown in FIG. 6, the adapter plug 55 (see FIG. 5) and the third electrode 33 (see FIG. 2) are held out of contact with each other as they are located remotely from each other. Safety and reliability are also enhanced because the third electrode 33 (the third terminal 58) is positioned on the side of the second power supply circuit section 53 remotely from the first power supply circuit section 52 when the battery pack is mounted on the battery charger.

(2) The first, second, and third terminals 56, 57, 58 of the battery charger are integrally mounted on the molded plate 60. Accordingly, the cost of assembling these terminals is relatively low.

(3) The molded plate 60 is of a hue such as blue different from the color of the housing 59, and the area of the lower casing member 35 which is enclosed by the dotted line 41 (FIG. 4) surrounding the holes 37, 38, 39 over the respective first, second, and third electrodes 9, 10, 33 is of also a hue such as blue different from the color of the lower casing member 35. If the molded plate 60 and the area enclosed by the dotted line 41 are of the same hue, such as blue, then the user can recognize the battery pack and the battery charger as a proper combination for charging.

In the case where the adapter plug 55 is positioned closer to the second terminal 57, which is a negative terminal, than to the first terminal 56, which is a positive terminal, as shown in FIG. 5, then the third terminal 58 may be positioned in the vicinity of the first terminal 56, and the third electrode 33 of the battery pack may be positioned closer to the second electrode 10, which is a negative electrode, than to the first electrode 9, which is a positive electrode. The temperature detecting element 28 may then be oriented in a direction opposite to that shown in FIG. 2, with the lead 30 connected to the second electrode 10.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A battery pack comprising:
   a casing;
   an array of juxtaposed cylindrical cells housed in said casing, said cells defining gaps therebetween;
   first and second electrodes housed in said case for charging and discharging said cells, said first and second electrodes being disposed in one of said gaps;
   a temperature detecting element disposed in said casing for detecting the temperature of said cells; and
   a third electrode disposed in said casing and electrically connected to said temperature detecting element, said third electrode comprising a thin sheet disposed between a side of one of said cells and said casing.

2. A battery pack according to claim 1, wherein said casing comprises a pair of casing member detachably connected to each other, a plurality of recesses for engaging a battery charger being defined in one of said casing members and positioned in said gaps, said one of the casing members having a plurality of holes aligned with said first, second, and third electrodes, respectively.

3. A battery pack in combination with a battery charger, comprising:
   A) a battery pack including:
      a casing;
      an array of juxtaposed cylindrical cells housed in said casing, said cells defining gaps therebetween;
      first and second electrodes housed in said casing for charging and discharging said cells, said first and second electrodes being disposed in one of said gaps;
      a temperature detecting element disposed in said casing for detecting the temperature of said cells; and
      a third electrode disposed in said casing and electrically connected to said temperature detecting element, said third electrode comprising a thin sheet disposed between a side of one of said cells and said casing; and
   B) a battery charger including:
      a housing having a cavity defined in a surface thereof for receiving the casing of said battery pack;
      first and second terminals mounted on the bottom of said cavity for electric contact with said first and second electrodes, respectively;
      a third terminal mounted on the bottom of said cavity for electric contact with said third electrode;
      a plurality of teeth mounted on the bottom of said cavity for fitting engagement in a plurality of recesses defined in said casing, respectively; and
      circuit means for charging the battery pack received in said cavity through the first and second electrodes and said first and second terminals which are held in electric contact with each other, and for controlling the charging process based on a temperature signal supplied from said temperature detecting element through said third electrode and said third terminal which are held in electric contact with each other.

4. A battery pack according to claim 3, wherein said first, second, and third terminals of said charger are spring-loaded under spring pressures such that the spring pressure applied to said third terminal is smaller than the spring pressure applied to said first and second terminals.

5. A battery pack according to claim 3, wherein said casing comprises a pair of casing members detachably connected to each other, said recesses being defined in one of said casing members, said one of the casing members having a plurality of holes aligned with said first, second, and third electrodes, respectively.

6. A battery pack according to claim 5, wherein said holes are defined in an area of said one of the casing members, said housing of said charger including a molded member, said first, second, and third terminals being mounted on said molded member, said area and said molded member being colored in the same hue as each other.

7. A battery pack comprising:
a casing having a plurality of recesses defined in a surface thereof;
an array of juxtaposed cylindrical cells housed in said casing, said cells defining gaps therebetween which accommodate said recesses;
first and second electrodes housed in said casing for charging and discharging said cells, said first and second electrodes being disposed in one of said gaps;
a temperature detecting element disposed in said casing for detecting the temperature of said cells; and
a third electrode disposed in said casing and electrically connected to said temperature detecting element, said third electrode comprising a thin sheet disposed between a side of one of said cells and said casing.

8. A battery charger for charging a battery pack having first, second and third electrodes, said charger comprising:
a housing having a cavity defined in a surface thereof for receiving the casing of said battery pack;
first and second terminals mounted on the bottom of said cavity for electric contact with said first and second electrodes of the battery pack, respectively;
a third terminal mounted on the bottom of said cavity for electric contact with the third electrode of the battery pack;
circuit means for charging the battery pack received in said cavity through said first and second terminals, and for controlling the charging process based on a temperature signal supplied through said third terminal;
wherein said first, second, and third terminals are spring loaded under spring pressures such that the spring pressure applied to said third terminal is smaller than the spring pressure applied to said first and second terminals.

* * * * *